(12) United States Patent
Miwa et al.

(10) Patent No.: US 7,485,213 B2
(45) Date of Patent: **\*Feb. 3, 2009**

(54) ELECTRODEIONIZATION APPARATUS

(75) Inventors: Masayuki Miwa, Tokyo (JP); Shin Sato, Tokyo (JP); Takayuki Moribe, Tokyo (JP)

(73) Assignee: Kurita Water Industries Ltd., Tokyo (JP)

( * ) Notice: Subject to any disclaimer, the term of this patent is extended or adjusted under 35 U.S.C. 154(b) by 24 days.

This patent is subject to a terminal disclaimer.

(21) Appl. No.: 10/535,035

(22) PCT Filed: Nov. 11, 2003

(86) PCT No.: PCT/IB03/05042

§ 371 (c)(1),
(2), (4) Date: May 12, 2005

(87) PCT Pub. No.: WO2004/047991

PCT Pub. Date: Jun. 10, 2004

(65) Prior Publication Data

US 2006/0037862 A1 Feb. 23, 2006

(30) Foreign Application Priority Data

Nov. 15, 2002 (JP) ............................. 2002-332672

(51) Int. Cl.
*B01D 61/48* (2006.01)
*C02F 1/469* (2006.01)

(52) U.S. Cl. ................................................ 204/632

(58) Field of Classification Search ................. 204/632
See application file for complete search history.

(56) References Cited

U.S. PATENT DOCUMENTS

| 5,868,915 | A | 2/1999 | Ganzi et al. | |
| 6,649,037 | B2 * | 11/2003 | Liang et al. | 204/632 |
| 6,733,646 | B2 * | 5/2004 | Sato et al. | 204/524 |
| 6,824,662 | B2 * | 11/2004 | Liang et al. | 204/524 |

FOREIGN PATENT DOCUMENTS

| EP | 0 170 895 | 2/1986 |
| EP | 0 870 533 | 10/1998 |
| EP | 1 222 954 | 7/2002 |
| JP | 4-72567 | 11/1992 |
| JP | 07-100391 | 4/1995 |
| JP | 07-236889 | 9/1995 |
| JP | 2002-205069 | 7/2002 |
| WO | WO 02/096807 | 12/2002 |

* cited by examiner

*Primary Examiner*—Arun S Phasge
(74) *Attorney, Agent, or Firm*—J.C. Patents

(57) ABSTRACT

An electrodeIonization apparatus comprising multiple anion exchange membranes 13 and cation exchange membranes 14 that are alternately arranged between a cathode 12 and an anode 11 to alternately form concentrating compartments 15 and desalting compartments 16 is described. The concentrating compartments 15 and the desalting compartments 16 are filled with ion exchangers, and the filling ratio of anion exchanger to cation exchanger of the ion exchanger in the concentrating compartments 15 is higher than that of the ion exchanger in the desalting compartments 16.

8 Claims, 1 Drawing Sheet

ELECTRODEIONIZATION APPARATUS

BACKGROUND OF THE INVENTION

1. Field of the Invention

The present invention relates to an electrodeionization apparatus. More specifically, the present invention relates to an electrodeionization apparatus having excellent desalting capacity and operational stability even with a high loading of weak ions including $CO_2$ and silica.

2. Description of the Related Art

Conventionally, the deionized water used in various industries including semiconductor manufacturing industry, liquid-crystal manufacturing industry, pharmaceutical industry, food industry and power industry, etc., as well as in research facilities, is frequently produced by using a type of electrodeionization apparatus described in, for example, Japanese Patent No. 1782943 (JP 1782943), JP 2751090 and JP 2699256. In the electrodeionization apparatus, multiple anion exchange membranes and cation exchange membranes are alternately arranged between a cathode and an anode to alternately form concentrating compartments and desalting compartments. The desalting compartments are filled with an ion exchanger that is constituted of a mixed ion exchange resin of anion exchange resin and cation exchange resin, ion exchange fibers or the like. Moreover, to reduce the electrical resistance of the concentrating compartments and thereby maintain the required current magnitude, an electrodeionization apparatus including concentrating compartments filled with an ion exchanger has also been proposed, as described in Japanese Patent Application Laid Open No. 2002-205069.

In such an electrodeionization apparatus, each kind of ion conducted into the desalting compartments reacts with the ion exchanger and moves in the ion exchanger along the direction of electrical potential gradient in a specific manner according to its affinity, concentration and mobility. The ions further traverse the membranes to maintain all compartments electrically neutral. Moreover, the ions are removed from the desalting compartments and concentrated in the adjacent concentrating compartments because of the semipermeable property of the membranes and the directionality of electrical potential gradient. That is, the cations and the anions permeate through the cation exchange membranes and the anion exchange membranes, respectively, and are concentrated in the concentrating compartments. Therefore, the water produced from the desalting compartments can be recovered as deionized water (pure water).

The above electrodeionization apparatus is capable of efficiently implementing a desalting treatment without the requirement of regenerating the ion exchange resin. Therefore, the electrodeionization apparatus has the capability of continuously producing deionized water of extremely high purity.

The cited Patent documents include:
Patent document 1: JP 1782943
Patent document 2: JP 2751090
Patent document 3: JP 2699256
Patent document 4: Japanese Patent Application Laid Open No. 2002-205069

However, when the loading of weak ions including $CO_2$ and silica in the electrodeionization apparatus is high, i.e., when the concentration of the weak ions including $CO_2$ and silica in the water being treated is high or the amount of such water being treated is large, the quality of the deionized water produced is deteriorated as indicated by the specific resistivity thereof. Moreover, the electrical resistance of the system gets higher after long-term use, so that the operational stability of the apparatus is lowered.

Moreover, Japanese Patent Application Laid Open No. 2002-205069 disclosed that the concentrating compartments can also be filled with an ion exchanger. As described in the prior art document, an electric conductor like an ion exchanger is filled in the concentrating compartments merely for maintaining the required current magnitude, so that the ratio of anion exchanger to cation exchanger of the ion exchanger is not particularly discussed. Therefore, as in the desalting compartments, a mixed ion exchange resin having the same "volume ratio of anion exchange resin to cation exchange resin" of 7:3 is filled in the concentrating compartments in the examples of Japanese Patent Application Laid Open No. 2002-205069.

To solve the problems of the prior art, one object of this invention is to provide an electrodeionization apparatus that has excellent desalting capacity and operational stability even when the loading of weak ions including $CO_2$ and silica is high.

SUMMARY OF THE INVENTION

The electrodeionization apparatus of this invention includes multiple anion exchange membranes and cation exchange membranes that are alternately arranged between a cathode and an anode to alternately form concentrating compartments and desalting compartments. The concentrating compartments and the desalting compartments are filled with ion exchangers, and the filling ratio of anion exchanger to cation exchanger of the ion exchanger in the concentrating compartments is higher than that of the ion exchanger in the desalting compartments.

As mentioned above, in the electrodeionization apparatus, the cations in the treated water permeate the cation exchange membranes to be concentrated in the concentrating compartments and then removed. Simultaneously, the anions in the treated water permeate the anion exchange membranes to be concentrated in the concentrating compartments and then removed. Meanwhile, $CO_2$ and silica among the weak ions that are difficult to remove are converted to $HCO_3^-$ and $HSiO_3^-$ by the $OH^-$ ions generated from the hydrolysis reaction in the desalting compartments, and are emitted to the concentrating compartments.

In the apparatus, the anionic species are most concentrated at the interfaces of the anion exchange membranes near the concentrating compartments because of the concentration polarization effect. When the concentration polarization of $HCO_3^-$ and $HSiO_3^-$ having low mobility gets overly large, the electrical resistance of the system is raised making the removal of ions difficult. Therefore, the removal ratio of the ions is lowered in the prior art.

In the above case, when a counter-charged cation exchanger is present at the interface of the anion exchange membrane near the concentrating compartment, the aforementioned concentration polarization occurs more easily because the motions of anions are retarded. On the contrary, when an anion exchanger exist at the interface, concentration polarization is difficult to occur because the motions of anions are accelerated. Particularly, when the filling ratio of anion exchanger to cation exchanger (abbreviated to anion/cation ratio hereinafter) of the ion exchanger in the concentrating compartments is higher than that of the ion exchanger in the desalting compartments as in this invention, the motions of anions including $HCO_3^-$ and $HSiO_3^-$ are accelerated.

The electrodeionization apparatus of this invention preferably has multiple desalting compartments and concentrating compartments, wherein the anion/cation ratio of the ion exchanger in the concentrating compartments is preferably 75/25 to 95/5 in particular. Moreover, the ion exchanger filled in the concentrating compartments is preferably an ion exchange resin, wherein the crosslinking degree of the anion exchange resin is preferably 3-8% and that of the cation exchange resin is preferably 5-10%. The anion exchange resin is preferably a thermostable anion exchange resin in particular.

As mentioned above, the electrodeionization apparatus of this invention has excellent desalting capacity and operational stability even when the loading of weak ions including $CO_2$ and silica is high Accordingly, even when the ratio of the water introduction rate (L/h) into the desalting compartment to the effective area ($dm^2$) of the anion exchange membrane in the desalting compartment is 5 or higher, or when at least one of the following two conditions (1) and (2) is satisfied, good results can be obtained in some aspects including the desalting capacity and the electrical resistance by setting the current density to 300 $mA/dm^2$ or higher. The condition (1) is that the ratio of the carbonate loading ($mg$-$CO_2$/h) into the desalting compartment to the effective area ($dm^2$) of the anion exchange membrane in the desalting compartment is 80 or higher. The condition (2) is that the ratio of the silica loading ($mg$-$SiO_2$/h) into the desalting compartment to the effective area ($dm^2$) of the anion exchange membrane in the desalting compartment is 8 or higher.

PREFERRED EMBODIMENT OF THE INVENTION

Figure 1:
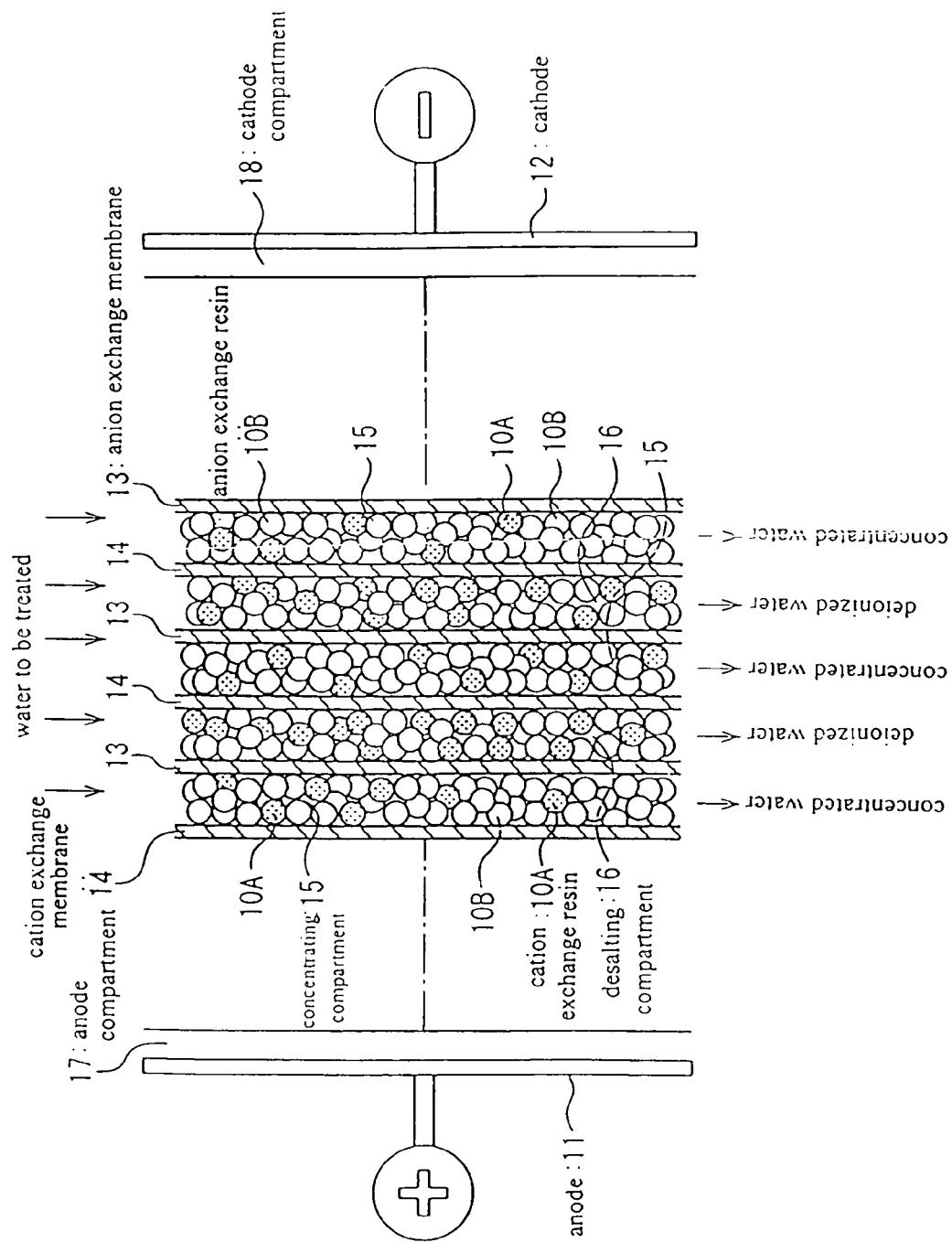
FIG. 1 schematically illustrates a cross-sectional view of an electrodeionization apparatus according to a preferred embodiment of this invention.

FIG. 1 schematically illustrates a cross-sectional view of an electrodeionization apparatus according to the preferred embodiment of this invention. The electro-deionization apparatus will be described in detail with reference to FIG. 1.

In the electrodeionization apparatus, multiple anion exchange membranes 13 and cation exchange membranes 14 are alternately arranged between two electrodes (an anode 11 and a cathode 12) to alternately form multiple concentrating compartments 15 and desalting compartments 16. The desalting compartments 16 and the concentrating compartments 15 are respectively filled with a mixed ion exchange resin of cation exchange resin 10A and anion exchange resin 10B. The anode compartment is labeled with "17", and the cathode compartment is labeled with "18".

In this invention, the anion/cation ratio of the mixed ion exchange resin filled in the concentrating compartments 15 is higher than that of the mixed ion exchange resin filled in the desalting compartments 16. Therefore, as explained above, the motions of anions including $HCO_3^-$ and $HSiO_3^-$ are accelerated so that concentration polarization near the anion exchange membranes 13 is prevented. However, when the anion/cation ratio of the mixed ion exchange resin in the concentrating compartments 15 is overly high, concentration polarization of cations will occur at the concentrating interface on the side of the cation exchange membrane 14 in the concentrating compartment 15. Therefore, the anion/cation ratio of the mixed ion exchange resin in the concentrating compartments 15 is generally 75/25-95/5, preferably 80/20-90/10 in particular. In addition, the anion/cation ratio is defined as the volume ratio of the anion exchange resin to the cation exchange resin in their regenerated forms.

Though ion exchange resin is used as the ion exchanger in the concentrating compartments 15 in the electrodeionization apparatus of FIG. 1, the ion exchanger filled in the concentrating compartments 15 is not restricted to ion exchange resin, and ion exchange fibers or a graft exchanger can also be used. However, the ion exchanger is preferably an ion exchange resin in consideration of handling facility. Moreover, it is also feasible to mix an inactive resin having no ion exchange site with the ion exchange resin. In such cases, the anion/cation ratio of the ion exchanger excluding the inactive resin is also within the aforementioned range.

When a mixed ion exchange resin is used as the ion exchanger filled in the concentrating compartments 15, the crosslinking degree of the anion exchange resin is preferably 3-8% and that of the cation exchange resin is preferably 5-10%. When the crosslinking degree of respective ion exchange resin is lower than the corresponding lower limit, the mechanical strength of the same is weak. When the crosslinking degree of respective ion exchange resin is higher than the corresponding upper limit, the electrical resistance of the system is adversely raised.

Moreover, when the percentage of anion exchange resin in the ion exchange resin in the concentrating compartments 15 is high, degradation will occur after long-term operation raising the electrical resistance. That is, generally, when the ion exchange resins are oxidized/degraded in the presence of oxygen, for example, the anion exchange resin is degraded prior to the cation exchange resin. Therefore, when the percentage of anion exchange resin in the concentrating compartments 15 is high, it is preferable to use an anion exchange resin that has high resistance to oxidization/degradation and good thermostability.

The water supplied to the electrodeionization apparatus is generally some raw water like city water that has been treated with active carbon and reverse osmosis (RO) separation, wherein the electrical conductivity is 3-10 $\mu S/cm$, the concentration of $CO_2$ is 3-30 ppm and the concentration of silica is 0.2-1.0 ppm. To treat such water, the anion/cation ratio of the ion exchange resin in the desalting compartments 16 is required to be 60/40-70/30. Moreover, the desalting compartments 16 are not restricted to fill with ion exchange resin, and other type of ion exchanger, such as ion exchange fibers or the like may also be used.

As in a conventional electrodeionization apparatus, the water to be treated is conducted into the concentrating compartments 15 and the desalting compartments 16 in the electrodeionization apparatus of this invention. Among the ions in the treated water conducted into the desalting compartments 16, the cations and the anions permeate the cation exchange membranes 14 and the anion exchange membranes 13, respectively, and are concentrated in the concentration compartments 15. Meanwhile, the water produced from the desalting compartments 16 is collected as deionized water. On the other hand, concentrated water containing a high concentration of ions is output from the concentrating compartments 15.

Moreover, the anode compartment 17 and the cathode compartment 18 are also introduced with electrode water, which is generally the effluent water (concentrated water) having a high concentration of ions from the concentrating compartments 15 for maintaining the electrical conductivity.

More specifically, the concentrated water having a high concentration of ions from the concentrating compartments 15 is generally divided into several portions. A portion of the concentrated water is circulated to the inlet of the concentrating compartments 15 for increasing the recovery ratio of water. Another portion is supplied to the inlet of the anode compartment 17, and the remaining portion is discharged outside the system as wastewater for preventing ion concentration within the system. Meanwhile, the effluent water from the anode compartment 17 is supplied to the inlet of the cathode compartment 18, and the effluent water from the cathode compartment 18 is discharged outside the system as wastewater.

In the aforementioned process, the possibility of concentration polarization, especially that of weak ions including $CO_2$ and silica, occurring at the concentrating interface of the anion exchange membrane 13 in the concentrating compartment 15 increases with the increase in the following parameters. One parameter is the amount of weak ions including $CO_2$ and silica conducted into the desalating compartments 16 Another parameter is the amount of weak ions including $CO_2$ and silica moving into the concentrating compartments 15 from the desalting compartments 16 through the anion exchange membranes 13. Still another parameter is the current density applied.

However, for the electrodeionization apparatus of this invention wherein the anion/cation ratio of the ion exchanger in the concentrating compartments 15 is higher than that of the ion exchanger in the desalting compartments 16, excellent desalting capacity and operational stability can be achieved even when the loading of weak ions is high. For example, the electrodeionization apparatus is stable in the aspects including desalting capacity and electric resistance even under the condition that the ratio of the carbonate loading (mg-$CO_2$/h) into the desalting compartment 16 to the effective area ($dm^2$) of the anion exchange membrane 13 in the desalting compartment 16 is 80 or higher (or even 250-300), or that the ratio of the silica loading (mg-$SiO_2$/h) into the desalting compartment 16 to the effective area ($dm^2$) of the anion exchange membrane 13 in the desalting compartment 16 is 8 or higher (or even 15-25), or that the current density is 300 mA/$dm^2$ or higher (or even 600-1200 mA/$dm^2$). Accordingly, the electrodeionization apparatus can be further compactified, which is quite attractive in consideration of economics.

Moreover, in the electrodeionization apparatus of this invention, the anode compartment 17 or the cathode compartment 18 can also be filled with an electric conductor or an ion exchanger like ion exchange resin.

EXAMPLES

The following examples and comparative examples are provided to specifically explain this invention.

Example 1

An electrodeionization apparatus having a water-treating capacity of 1000 L/h is used, which is constituted of eight desalting compartments each having dimensions of 250 mm×400 mms×5 mm (effective width×height×thickness) and concentrating compartments each having a thickness of 2.5 mm. The desalting compartments and the concentrating compartments are respectively filled with a mixed ion exchange resin described below. The water supplied to the apparatus is city water that has been treated with active carbon and reverse osmosis (RO) separation. The quality of the supplied water is as follows: electrical conductivity=10 μS/cm; $CO_2$ concentration=20 ppm; $SiO_2$ concentration=1 ppm; water temperature=10° C. In addition, the effective area ($dm^2$) of the anion exchange membrane in the desalting compartments of the electrodeionization apparatus is 10 $dm^2$. In the desalting compartments: a mixed ion exchange resin having an "anion exchange resin/cation exchange resin" ratio (anion/cation ratio) of 7/3 (v/v) In the concentrating compartments: a mixed ion exchange resin having an anion/cation ratio listed in Table 1.

The water flow rate into the inlets of the desalting compartments is 1000 L/h, and that into the inlets of the concentrating compartments is 400 L/h. The concentrated water flowing out of the concentrating compartments is divided into three portions, wherein a portion is discharged outside the system at a flow rate of 200 L/h, and another portion is sequentially conducted through the anode compartment and the cathode compartment and then discharged outside the system at a flow rate of 50 L/h. The remaining portion of the concentrated water is circulated to the inlets of the concentrating compartments.

The water introduction operation is continued under a current of 8 A for a month, wherein the conditions of water introduction are listed below. The specific resistivity of the output water and the operation voltage after a month are listed in Table 1. The specific resistivity and the operation voltage are stable and do not deviate from the values measured in the beginning. The conditions of water introduction include:

1) the ratio of the water introduction rate (L/h) into the desalting compartment to the effective area ($dm^2$) of the anion exchange membrane in the desalting compartment being 12.5;
2) the ratio of the carbonate loading (mg-$CO_2$/h) into the desalting compartment to the effective area ($dm^2$) of the anion exchange membrane in the desalting compartment being 250;
3) the ratio of the silica loading (mg-$SiO_2$/h) into the desalting compartment to the effective area ($dm^2$) of the anion exchange membrane in the desalting compartment being 12.5; and
4) the current density being 800 mA/$dm^2$.

Examples 2-4 and Comparative Examples 1-2

In each of the examples, the water introduction operation is implemented as in Example 1 except that the anion/cation ratio of the mixed ion exchange resin filled in the concentrating compartments is varied as in Table 1. The specific resistivity of the output water and the operation voltage after a month in each example are listed in Table 1.

TABLE 1

|  |  | Anion/cation ratio of the ion exchange resin filled in the concentrating compartments (anion exchange resin:cation exchange resin (v/v)) | After a month of water introduction | |
|---|---|---|---|---|
|  |  |  | Specific resistivity of water produced (MΩ·cm) | Operation voltage (V) |
| Examples | 1 | 8:2 | 15 | 86 |
|  | 2 | 9:1 | 14 | 86 |
|  | 3 | 7.5:2.5 | 15 | 90 |
|  | 4 | 9.5:0.5 | 14 | 88 |
| Comparative Examples | 1 | 7:3 | 12 | 126 |
|  | 2 | 6:4 | 11 | 134 |

As shown in Table 1, when the anion/cation ratio of the ion exchange resin filled in the concentrating compartments is higher than that of the ion exchange resin filled in the desalting compartments, especially when the volume ratio of the anion exchange resin to the cation exchange resin in the concentrating compartments is 8:2 to 9:1, excellent desalting capacity and operational stability can be achieved even when the loading of weak ions including $CO_2$ and silica is high.

UTILITY IN THE INDUSTRY

As mentioned above, with the principles of the present invention, an electrodeionization apparatus can be provided with excellent desalting capacity and operational stability even when the loading of weak ions including $CO_2$ and silica is high.

What is claimed is:

1. An electrodeionization apparatus, comprising:
a plurality of anion exchange membranes and a plurality of cation exchange membranes that are alternately arranged between a cathode and an anode, the anion exchange membranes and the cation exchange membranes configuring a plurality of concentrating compartments and a plurality of desalting compartments alternately arranged, wherein
the concentrating compartments are filled with first ion exchangers, the first ion exchangers being composed of a mixture mixed by anion exchangers and cation ion exchangers with a first ratio of anion exchangers to cation ion exchangers;
the desalting compartments are filled with second ion exchangers, the second ion exchangers being composed of a mixture mixed by anion exchangers and cation ion exchangers with a second ratio of anion exchangers to cation ion exchangers,
wherein the first ratio is higher than the second ratio.

2. The electrodeionization apparatus according to claim 1, which comprises a plurality of concentrating compartments and a plurality of desalting compartments, wherein the filling ratio of anion exchanger to cation exchanger of the ion exchanger in the concentrating compartments ranges from 75/25 to 95/5.

3. The electrodeionization apparatus according to claim 1, wherein the ion exchanger in the concentrating compartment comprises a mixed ion exchange resin comprising an anion exchange resin and a cation exchange resin, wherein a crosslinking degree of the anion exchange resin is 3-8%, and a crosslinking degree of the cation exchange resin is 5-10%.

4. The electrodeionization apparatus according to claim 1, wherein a ratio of a water introduction rate (L/h) into the desalting compartment to an effective area ($dm^2$) of the anion exchange membrane in the desalting compartment is 5 or higher.

5. The electrodeionization apparatus according to claim 1, which satisfies at least one of the following two conditions (1) and (2):
(1) a ratio of a carbonate loading (mg-$CO_2$/h) into the desalting compartment to an effective area ($dm^2$) of the anion exchange membrane in the desalting compartment being 80 or higher; and
(2) a ratio of a silica loading (mg-$SiO_2$/h) into the desalting compartment to an effective area ($dm^2$) of the anion exchange membrane in the desalting compartment being 8 or higher.

6. The electrodeionization apparatus according to claim 1, wherein a current density of 300 mA/$dm^2$ or higher is applied.

7. The electrodeionization apparatus according to claim 1, wherein the concentrating compartment is filled with an anion exchange resin that comprises a thermostable anion exchange resin.

8. The electrodeionization apparatus according to claim 1, wherein each of the concentrating compartments is sandwiched by two adjacent desalting compartments.

* * * * *